United States Patent
Nakai et al.

(10) Patent No.: US 7,265,505 B2
(45) Date of Patent: Sep. 4, 2007

(54) CONTROL APPARATUS FOR SELECTIVELY DRIVING PLURAL STATOR WINDINGS OF SYNCHRONOUS MOTOR

(75) Inventors: Yasuhiro Nakai, Kariya (JP); Shigeru Kamio, Nagoya (JP)

(73) Assignee: DENSO Corporation (JP)

( * ) Notice: Subject to any disclaimer, the term of this patent is extended or adjusted under 35 U.S.C. 154(b) by 0 days.

(21) Appl. No.: 11/028,856

(22) Filed: Jan. 5, 2005

(65) Prior Publication Data

US 2005/0151491 A1 Jul. 14, 2005

(30) Foreign Application Priority Data

Jan. 9, 2004 (JP) .............................. 2004-003757

(51) Int. Cl.
*H02P 1/54* (2006.01)
*H02P 5/00* (2006.01)
*H02P 5/46* (2006.01)

(52) U.S. Cl. .................. 318/98; 318/430; 318/432; 318/434; 318/138; 318/254; 318/439; 318/560; 318/700

(58) Field of Classification Search ........ 318/111–113, 318/138, 439, 254, 700–800, 430–434, 560–569, 318/98, 661; 310/68 B, 179; 324/200
See application file for complete search history.

(56) References Cited

U.S. PATENT DOCUMENTS

| 4,503,369 | A | * | 3/1985 | Nishijima et al. .......... 318/254 |
| 5,625,262 | A | * | 4/1997 | Lapota ...................... 318/71 |
| 6,992,451 | B2 | * | 1/2006 | Kamio et al. .............. 318/434 |
| 7,005,814 | B2 | * | 2/2006 | Nakai et al. ............... 318/254 |
| 7,075,259 | B2 | * | 7/2006 | Nakai et al. ............... 318/432 |
| 2003/0222617 | A1 | * | 12/2003 | Nakai et al. ............... 318/701 |
| 2004/0066165 | A1 | * | 4/2004 | Kamio et al. .............. 318/701 |
| 2004/0066166 | A1 | * | 4/2004 | Nakai et al. ............... 318/701 |
| 2005/0146302 | A1 | * | 7/2005 | Kamio et al. .............. 318/647 |
| 2005/0151491 | A1 | * | 7/2005 | Nakai et al. ............... 318/98 |
| 2005/0156550 | A1 | * | 7/2005 | Kamio et al. .............. 318/445 |
| 2006/0006827 | A1 | * | 1/2006 | Nakai et al. ............... 318/701 |
| 2006/0033464 | A1 | * | 2/2006 | Nakai et al. ............... 318/701 |

FOREIGN PATENT DOCUMENTS

JP 2001-271917 10/2001

* cited by examiner

*Primary Examiner*—Lincoln Donovan
*Assistant Examiner*—Tyrone Smith
(74) *Attorney, Agent, or Firm*—Nixon & Vanderhye PC

(57) ABSTRACT

A control apparatus for a synchronous motor such as a switched reluctance motor, having a plurality of respectively separate stator windings, can operate the motor in either a normal mode or a low-torque mode by selectively supplying drive current to the stator windings. In the low-torque mode, alternate ones of the stator windings are driven in succession, thereby ensuring that electromagnetic forces will not be continually applied to the rotor of the motor along the same limited range of directions and so preventing unbalanced wear of the rotor shaft and bearings.

18 Claims, 7 Drawing Sheets

FIG. 5

STATOR WINDING SYSTEM DRIVE TABLES

|  |  | 1 | 2 | 3 | 4 | 5 | 6 | 7 | 8 | 9 | 10 | 11 | 12 |
|---|---|---|---|---|---|---|---|---|---|---|---|---|---|
| NORMAL DRIVE (2-SYSTEM CONDUCTION) | SYSTEM A | Ua | UaVa | Va | VaWa | Wa | WaUa | Ua | UaVa | Va | VaWa | Wa | WaUa |
|  | SYSTEM B | Ub | UbVb | Vb | VbWb | Wb | WbUb | Ub | UbVb | Vb | VbWb | Wb | WbUb |
| LOW-TORQUE DRIVE (1-SYSTEM CONDUCTION) | EXAMPLE 1 SYSTEM A | Ua | UaVa | Va | VaWa | Wa |  |  |  |  |  |  | Ua |
|  | SYSTEM B |  |  |  |  |  | Ub |  | UbVb | Vb | VbWb | Wb |  |
|  | EXAMPLE 2 SYSTEM A | Ua | Ua |  | Wa | Wa | Wa | Ub | Va | Va | Va | Wb | Wb |
|  | SYSTEM B |  | Vb | Vb | Vb |  | Ub | Ub | Ub |  |  |  |  |
|  | EXAMPLE 3 SYSTEM A | Ua | Va |  | Va | Wa | Ua | Ub | Ua | Va | Wa |  | Wa |
|  | SYSTEM B |  | Ub |  | Wb |  | Wb | Ub | Vb |  | Vb | Wb | Ub |

FIG. 8

STATOR WINDING SYSTEM DRIVE TABLES

| | | 1 | 2 | 3 | 4 | 5 | 6 | 7 | 8 | 9 | 10 | 11 | 12 |
|---|---|---|---|---|---|---|---|---|---|---|---|---|---|
| NORMAL DRIVE (2-SYSTEM DRIVE) | SYSTEM A | Ua | UaVa | Va | VaWa | Wa | WaUa | Ua | UaVa | Va | VaWa | Wa | WaUa |
| | SYSTEM B | Ub | UbVb | Vb | VbWb | Wb | WbUb | Ub | UbVb | Vb | VbWb | Wb | WbUb |
| LOW-TORQUE DRIVE (1-SYSTEM DRIVE) | SYSTEM A | Ua | UaVa | Va | VaWa | Wa | WaUa | Ua | UaVa | Va | VaWa | Wa | WaUa |
| LOW-TORQUE DRIVE (1-SYSTEM DRIVE) | SYSTEM B | Ub | UbVb | Vb | VbWb | Wb | WbUb | Ub | UbVb | Vb | VbWb | Wb | WbUb |

CONTROL APPARATUS FOR SELECTIVELY DRIVING PLURAL STATOR WINDINGS OF SYNCHRONOUS MOTOR

CROSS-REFERENCE TO RELATED APPLICATIONS

This application is based on and incorporates herein by reference Japanese Patent Application No. 2004-003757 filed on Jan. 9, 2004.

BACKGROUND OF THE INVENTION

Field of Application

The present invention relates to a control apparatus for a synchronous motor having a stator core with a plurality of a stator windings formed thereon, with the stator windings being driven as respectively separate systems, and with each stator winding being individually capable of effecting rotation of the rotor of the motor when supplied with drive current.

Since a conventional type of motor will become inoperable if a short-circuit occurs in the stator winding (sometimes referred to as stator coil, or drive coil), it has been proposed in the prior art to provide a motor with two stator windings, controlled as respectively separate systems. These are formed such that the rotor of the motor can be driven for rotation even when only one of the two stator windings is being supplied with current, so that the motor can continue to be used even if a short-circuit should occur in one of the stator windings.

This type of arrangement is described for example in Japanese Patent Laid-open No. 2001-271917.

Such a motor will produce a lower level of torque when the stator winding of only one system is being driven than is the case when both of the stator windings are being driven, For that reason such a motor would be advantageous for use in certain applications in which it is required, under some circumstances, to generate a lower level of torque than a normal level. For example, some types of position switching mechanism are configured such that a movable member can be moved (actuated by a motor) to the limit position of a range of movement, i.e., until the moveable member contacts a stopper, so that the limit position can, in effect, be "learned" by the mechanism. When this "learning" operation is being performed, it is desirable that the drive motor produces a lower level of torque than normal, to prevent damage to the mechanism as a result of the moveable member contacting the stopper, and possible malfunction.

The torque produced by a motor can be reduced by lowering the average level of drive current supplied to operate the motor, e.g., by lowering the duty ratio in the case of the drive current being supplied as a pulse train that is modulated by PWM (pulse width modulation), lowering the pulse amplitude, in the case of the drive current pulses being modulated by PAM (pulse amplitude modulation), etc. However this has the disadvantage of increased cost and complexity of circuits which control and supply the motor drive current.

As an alternative, a motor having a two-system stator winding configuration as described above can be utilized, with drive current being supplied to only one of the two stator windings when the low-torque operating mode is to be established, and being supplied to both of the stator windings when a normal (i.e., high-torque) operating mode is to be established.

However with such a method, when drive current is being supplied to only one of the two stator windings, the electromagnetic forces acting on the rotor will be unbalanced, i.e., will always act along a limited range of directions, corresponding to the stator winding to which current is supplied during the low-torque operating mode. Thus, an unbalanced load, acting always along the same direction, will be applied continuously between the rotor shaft and the rotor bearings during operation in the low-torque mode, resulting in uneven wear of these. The rotor axis may thereby become tilted, to such an extent that the periphery of the rotor may contact the stator core. In the worst case, rotation of the rotor may become hindered or prevented. Hence, this is a serious problem with respect to reliability of the motor.

SUMMARY OF THE INVENTION

It is an objective of the present invention to overcome the above problems, by providing a control apparatus for a type of synchronous motor which has a plurality of stator windings that can be driven respectively separately, with each of the stator windings being capable by itself, when provided with drive current, of producing rotation of the motor rotor, whereby uneven wear of the rotor shaft and bearings of the motor, caused by operation of the motor in a mode in which only a part of the plurality of stator windings are driven, can be prevented.

To achieve the above objective, according to a first aspect, a motor control apparatus according to the present invention is selectively operable in a normal-torque drive mode and a low-torque drive mode, and supplies drive current concurrently to each of the stator windings of the motor during operation in the normal-torque mode. During operation in the low-torque mode, the control apparatus selectively supplies drive current to successively alternating sub-sets of the plurality of stator windings in a predetermined sequence.

In that way, by appropriately predetermining that sequence, it can be ensured that the direction in which force is applied between the rotor and the motor bearings, due to electromagnetic forces produced by the stator during low-torque operation, are successively altered, so that uneven wear can be prevented.

Typically, each of the sub-sets would be a single stator windings, formed of a set of phase windings. Normally, such a synchronous motor is of 3-phase type, with each stator winding formed of three phase windings.

The motor control apparatus can be configured such that during operation in the low-torque mode, the motor control apparatus successively supplies drive current to alternating ones of the plurality of stator winding in a predetermined pattern that is repeated in a fixed cycle.

For example, it can be arranged that drive current is supplied alternating ones of the stator windings during successive drive intervals that are of equal duration, in each cycle, with drive current being supplied to successive phase windings of a stator winding during respective phase periods, within each drive interval.

Preferably, the motor control apparatus is configured to supply drive current concurrently to respective phase windings of a pair of the stator windings, each time a changeover occurs between supplying drive current to respective ones of the pair. In that way, it can be ensured that there is transitory decreases in the level of torque produced by the motor will not ouccur due to switching between supplying drive current to respectively different stator windings, so that stable and smooth rotation can be maintained.

From another aspect, such a motor control apparatus can be configured such that each time the low-torque mode is re-entered, the control apparatus supplied drive current to a sub-set of the plurality of stator windings that is different from the sub-set that was driven during an immediately preceding occasion when the low-torque mode was established and then terminated. As described above, each sub-set may of course consist of a single stator winding. It can be understood that in this case too, it is ensured that unbalanced wear of the rotor shaft and motor bearings as a result of prolonged operation of the motor in the low-torque mode can be prevented, since the direction in which electromagnetic forces are applied to the rotor from the stator will be different, each time the low-torque mode is newly established.

BRIEF DESCRIPTION OF THE DRAWINGS

FIG. 5 shows a set of stator winding drive tables, expressing respective patterns in which drive currents are successively supplied to the stator windings of the motor controlled by the first embodiment;

FIG. 8 shows a set of stator winding drive tables that are utilized with the second embodiment.

DESCRIPTION OF PREFERRED EMBODIMENTS

Figure 1:
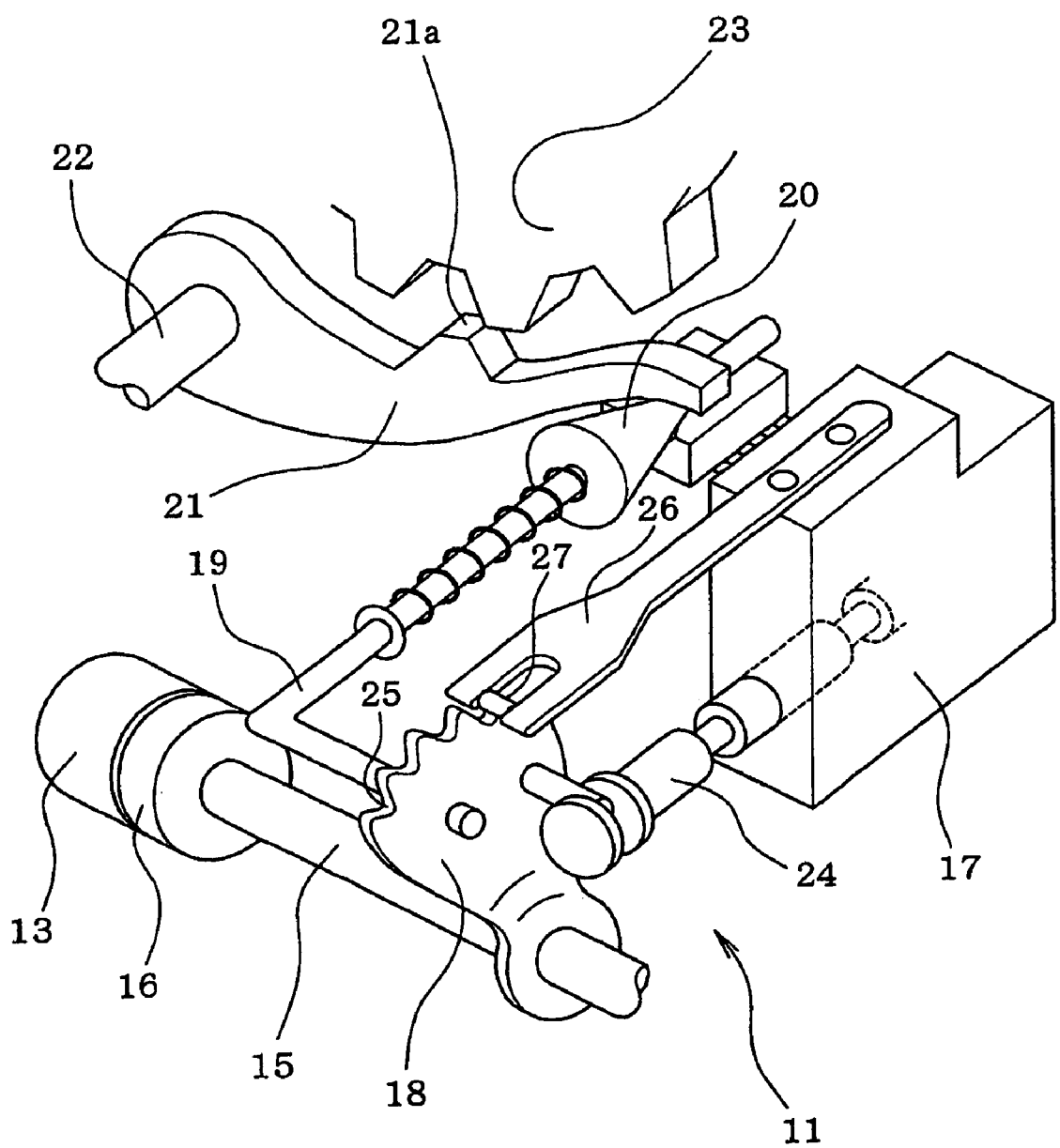
FIG. 1 is an oblique view of a first embodiment of a motor control apparatus, which functions as a shift position switching apparatus for controlling a vehicle automatic transmission.

Embodiments of a motor control apparatus will be described in the following that are for example applicable to controlling a motor to perform position control in a mechanism such as that shown in FIG. 1. This is a shift position switching mechanism 11, for an automatic transmission apparatus (referred to in the following simply as an automatic transmission) of a vehicle. The shift position switching mechanism 11 will be described referring to FIG. 1 in conjunction with FIG. 2. FIG. 2 conceptually illustrates an overall system for controlling the automatic transmission operation of a vehicle, with the overall system incorporating a range switching control apparatus 32 as a first embodiment of the invention. The overall system also includes an automatic transmission 12 that is directly controlled by the shift position switching mechanism 11, with the shift position switching mechanism 11 being operated by a SR motor 13 that is controlled by the range switching control apparatus 32.

The shift position switching mechanism 11 is used to control changing of the automatic transmission 12 between respective shift positions, i.e., a parking position (P), a reverse position (R), a neutral position (N) and a drive position (D).

The SR motor 13 is a synchronous motor, which will be assumed to be a switched reluctance (hereinafter SR) type of motor in this embodiment, and is provided internally with a speed reduction mechanism 14, coupled between the rotor shaft of the SR motor 13 and the shift position switching mechanism 11. A shaft sensor 16 serves to detect the rotation angle of the shaft 15 of the speed reduction mechanism 14.

Figure 2:
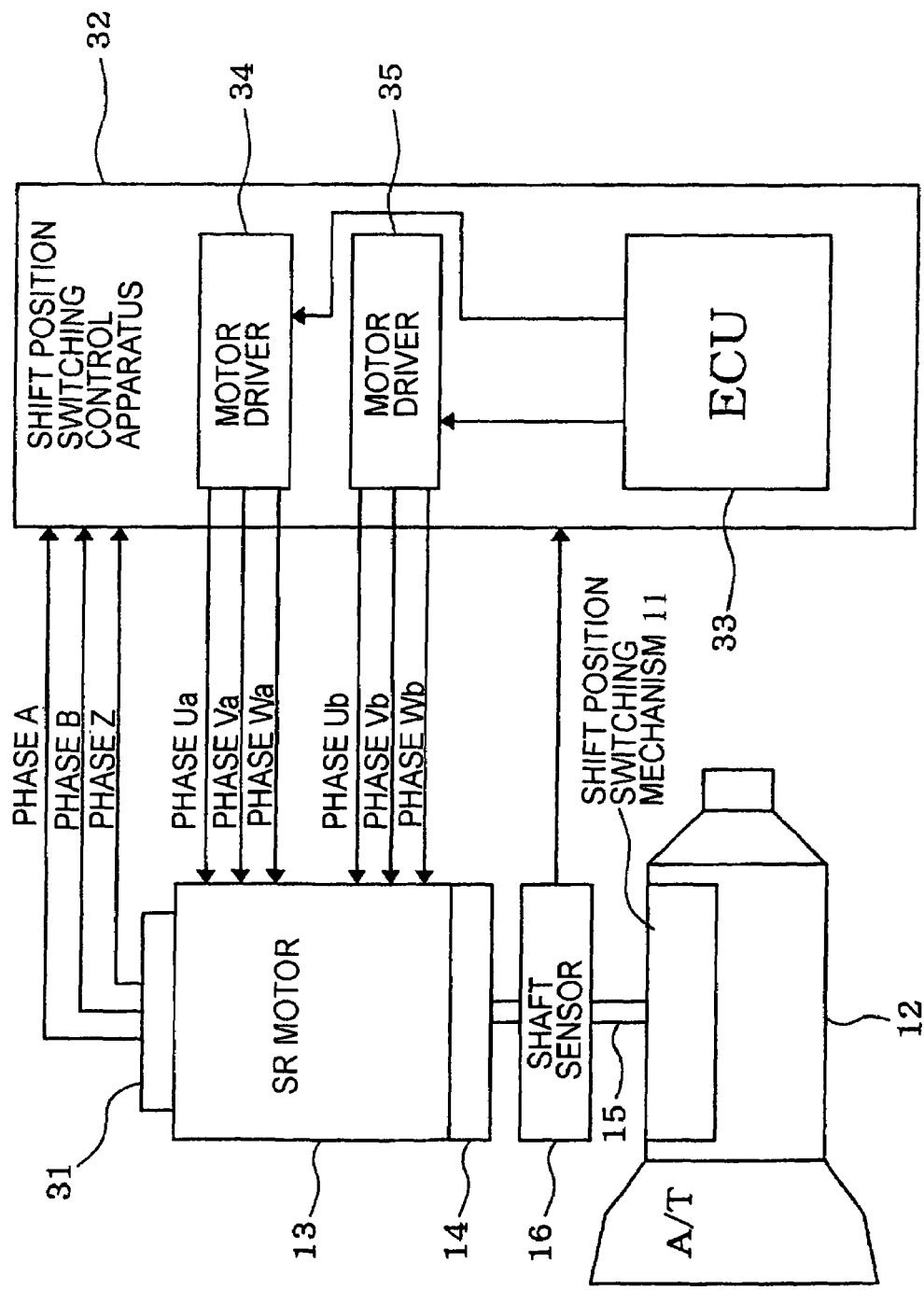
FIG. 2 is a conceptual block diagram of the first embodiment.

As shown in FIG. 1, the shaft 15 has a detent lever 18 attached thereto, for controlling a degree of opening of a manual valve 17, which is within an oil pressure circuit (i.e., hydraulic circuit) of the automatic transmission 12. An L-shaped parking rod 19 is attached to the detent lever 18, and a conical member 20 that is mounted on the tip of parking rod 19 engages with a lock lever 21. The lock lever 21 serves to lock and unlock a parking gear 23, being rotated about a shaft 22 as a center of rotation, to thereby be moved upward or downward, and so moved towards or away from the parking gear 23, in accordance with the position of the conical member 20.

The parking gear 23 is fixedly mounted on the shaft of the automatic transmission 12. When the parking gear 23 is locked by the action of the lock lever 21, the rear road wheels of the vehicle are prevented from rotation, so that the vehicle will not move when the automatic transmission is set at the parked (P) position.

The detent lever 18 has a spool valve 24 of the manual valve 17 coupled thereto, and when the shaft 15 and the detent lever 18 are rotated together by the SR motor 13 (acting through the speed reduction mechanism 14), the position of the spool valve 24 of the manual valve 17 is changed over, and the shift position of the automatic transmission 12 is thereby changed, i.e., to the parking position (P), reverse position (R), neutral position (N) or drive position (D). The detent lever 18 is formed with four recessed portions 25, for holding the spool valve 24 in a position corresponding to the shift position that is selected.

The detent spring 26, which holds the detent lever 18 at a position corresponding to the selected shift position, is fixed to the manual valve 17, and a coupling portion 27 that is provided at the tip of the detent spring 26 engages in one of the recessed portions 25 of the detent lever 18 that corresponds to the selected shift position, so that the detent lever 18 is held at a rotation angle corresponding to that selected shift position, and the spool valve 24 of the manual valve 17 is held at a position corresponding to the selected shift position.

In the case of the parking (P) shift position, the parking rod 19 is moved in a direction such as to become adjacent to the lock lever 21, and a wide-diameter portion of the conical member 20 presses upward against the lock lever 21, so that the protruding portion 21a of the lock lever 21 engages with the parking gear 23, thereby locking the parking gear 23 in place. In that way, the shaft of the automatic transmission 12, i.e., the drive shaft of the vehicle, is held in a locked condition, so that the vehicle is held in the parking condition.

When any shift position other than the P shift position is selected, the parking rod 19 is moved away from the lock lever 21, so that the wide-diameter portion of the conical member 20 is moved back from the lock lever 21, and the lock lever 21 thereby becomes lowered. As a result, the protruding portion 21a of the lock lever 21 becomes separated from the parking gear 23, so that the locked condition of the parking gear 23 is released. The shaft of the automatic transmission 12 can then rotate, so that the vehicle can be driven.

The shaft sensor 16 is made up of a rotation sensor such as a potentiometer, producing an output voltage that changes linearly in accordance with changes in the angular position of the shaft 15 of the speed reduction mechanism 14 of the SR motor 13. That output voltage from the shaft sensor 16 is used to indicate the rotation angle of the shaft 15 at the current point in time, with that rotation angle determining whether the automatic transmission 12 is set to the parking position (P), reverse position (R), neutral position (N) or drive position (D).

Figure 3:
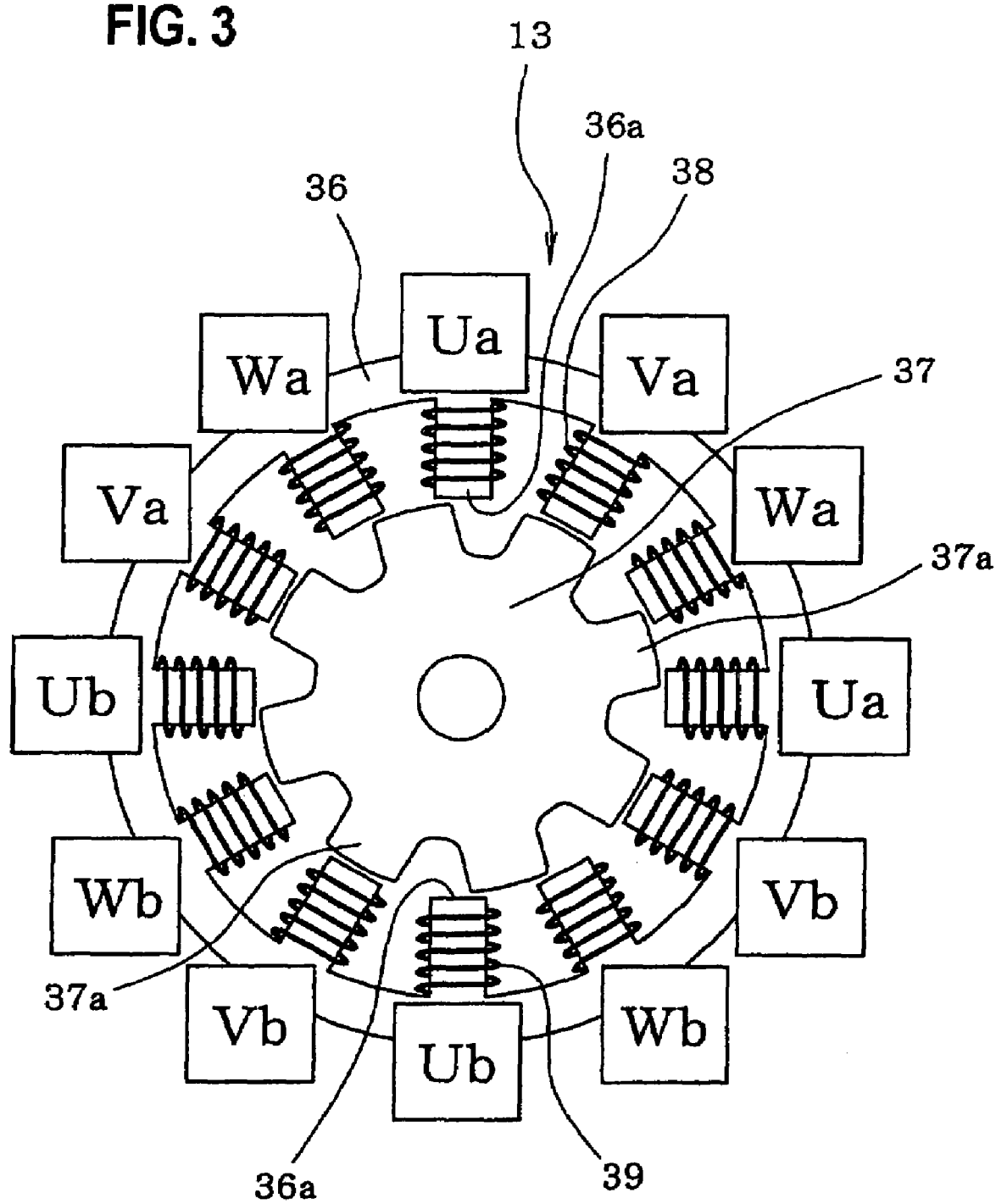
FIG. 3 is a diagram for use in describing the configuration of a switched reluctance type of synchronous motor that is controlled by the first embodiment.

The configuration of the SR motor 13 will be described referring to FIGS. 3 and 4. The SR motor 13 has a stator core 36 and a rotor 37, which are each of salient-pole type as illustrated in FIG. 3. Such a type of SR motor has the advantage of a simple construction, which can be readily assembled, and does not require the incorporation of permanent magnets. The stator core 36 has twelve stator poles 36a, protruding radially inward, disposed at equidistant spacings around the inner circumference of the stator core 36. The rotor 37 is provided with eight rotor poles 37a, protruding radially outward, disposed at equidistant spacings around the outer circumference of the rotor 37. A small air gap is provided between respective end faces of the rotor poles 37a and of the stator poles 36a, when these become disposed mutually opposing as the motor shaft-rotates.

The SR motor 13 has two separate stator windings 38, 39 formed on the stator core 36. Each of the stator windings 38 and 39 is made up of three phase windings, with each phase winding being wound around a corresponding pair of the stator poles 36a. Each of the phase windings is independently driven.

Figure 4:
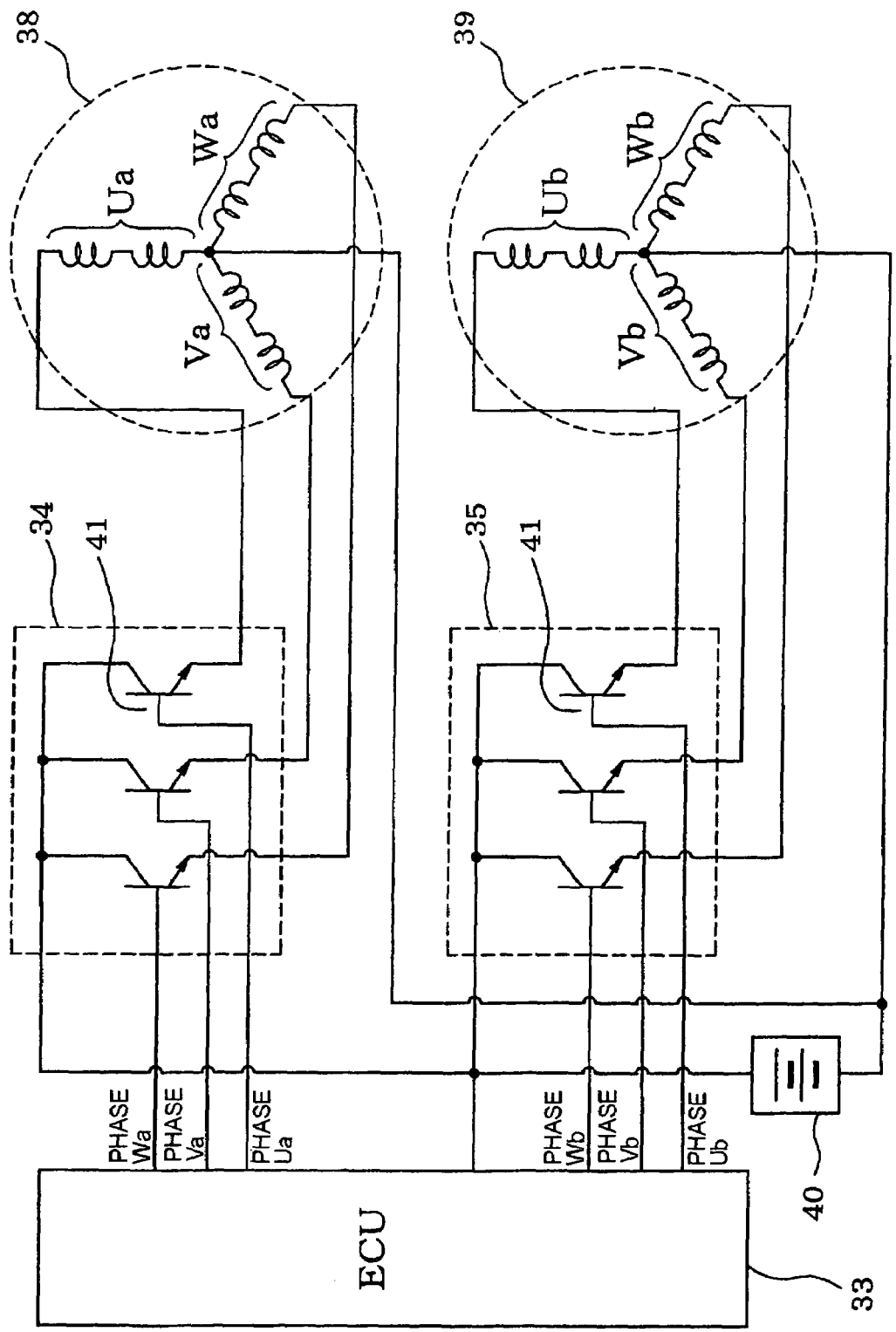
FIG. 4 is a circuit diagram for describing stator winding drive circuits in the first embodiment.

As shown in FIG. 4, the stator windings 38 and 39 are driven as respectively separate systems, which will be designated as system A and system B respectively. For that reason the three phase windings of the stator winding 38 are designated as the Ua, Va and Wa phase windings respectively, and the corresponding drive current phases will be designated as the Ua, Va and Wa phases respectively. Similarly, the three phase windings of the stator winding 39 are designated as the Ub, Vb and Wb phase windings respectively, and the corresponding drive voltage phases will be designated as the Ub, Vb and Wb phases respectively.

As shown in FIG. 3, poles of corresponding phase in the A and B systems are disposed mutually opposing in a symmetrical configuration, so that for example one of the Ua poles (i.e., having the Ua phase winding of the stator winding 38 formed thereon) is disposed diametrically opposite a Ub pole (having the Ub phase winding of the stator winding 39 formed thereon).

It should be noted that it would be equally possible to utilize a motor having different numbers of poles from those of this example.

The sequence in which the stator windings 38, 39 are wound on the twelve stator poles 36a of the stator core 36 with this embodiment is:

Va phase→Wa phase→Ua phase→Va phase→Wa phase→Ua phase→Vb phase→Wb phase→Ub phase→Vb phase→Wb phase→Ub phase.

As shown in FIG. 4, the stator windings 38, 39 operate from a battery of the vehicle as a power source, and are driven by respectively different motor drive circuits 44, 45. In that way, even if a failure such as a short-circuit should occur in one of the systems A or B, the SR motor 13 can continue to be driven by the other system.

In addition, when it is required that the SR motor 13 produce a lower level of output torque than that produced during normal operation (for example, when it is necessary for the shift position switching mechanism 11 perform a "reference position learning" operation as described hereinabove), this can be achieved by applying drive voltages to only one of the two stator windings.

With the circuit configuration shown in FIG. 4 for respective motor drive circuits 34 and 35 of the phase windings 38, 39, a unipolar output configuration is used, with a single output transistor 41a or 41b being employed to drive a corresponding one of the phase windings. That is to say, each output transistor operates as a switching element, to perform selective ON/OFF switching of supplying the voltage of the battery 40 to the corresponding phase winding (during the aforementioned respective time periods in a cyclically repeated pattern) in accordance with the state of a corresponding control signal that is applied to the base electrode of the transistor from the ECU 33 at appropriate timings. That control signal is one of a set of signals produced by the ECU 33, designated as the phase Ua, phase Va and phase Wa control signals, that control respective drive transistors of the motor driver circuit 34 as shown in FIG. 4, or one of the phase Ub, phase Vb and phase Wb control signals, that control respective drive transistors of the motor driver circuit 35.

It would of course be equally possible to use a bipolar type of output circuit arrangement, employing a pair of transistors, to drive each of the phase windings.

As shown in FIG. 2, the ECU 33 and the motor drive circuits 34, 35, in combination, constitute the range switching control apparatus 32.

The SR motor 13 is provided with an encoder 31, for detecting the angular position of the rotor 37 of the SR motor 13. The encoder 31 of this embodiment will be assumed to be a magnetic type of rotary encoder, which outputs pulse signals (designated as the phase A, phase B, and phase Z pulse signals) that are synchronized with the rotation of the rotor 37, and supplies these signals to the range switching control apparatus 32. The ECU 33 of the range switching control apparatus 32 performs counting on successive rising edges and falling edges of the phase A and phase B pulse signals from the encoder 31.

The ECU 33 produces the aforementioned phase Ua, phase Va and phase Wa control signals, for driving the stator winding 38 at appropriate timings, and the phase Ub, phase Vb and phase Wb control signals for similarly driving the stator winding 39, at timings determined by the pulse signals supplied from the encoder 31, with the control signals being produced in the aforementioned cyclically repeated pattern, in accordance with a table of values held stored in a memory of the ECU 33. Such a table is referred to in the following as a stator winding drive table, described in detail hereinafter.

The direction of rotation of the rotor 37 of the SR motor 13 is determined by the order in which the phase A and phase B control signals are generated by the ECU 33. In the case of clockwise rotation (as viewed in FIG. 3) of the rotor 37, which is the direction for effecting change from the P to the D shift position of the automatic transmission, the pulse signals from the encoder 31 are counted up by the ECU 33. Conversely, in the case of counter-clockwise rotation (as of the rotor 37 (which is the direction for effecting change from the D to the P shift position of the automatic transmission), the pulse signals from the encoder 31 are counted down. In that way, since the relationships between the count values obtained by counting the encoder signals and corresponding angular positions of the rotor 37 of the SR motor 13 are held fixed irrespective of whether the SR motor 13 performs forward or reverse rotation, the angular position of the rotor 37 can be detected based on these count values irrespective of whether the rotor 37 is rotated in the forward or the reverse direction.

The phase Z pulse signal that is produced by the encoder 31 is used by the ECU 33 to detect when the rotor 37 attains a reference angular position.

When the vehicle driver actuates the shift lever of the automatic transmission 12, the ECU 33 sets a target rotation angle (i.e., target value of encoder pulse count) corresponding to the shift position that corresponds to the actuation position of the shift lever. The ECU 33 then begins to control the motor driver circuits 34 and 35 to supply drive current to the stator windings 38, 39 of the SR motor 13, by feedback control operation, to effect rotation of the rotor 37 until the encoder pulse count value reaches the target value. During a normal control mode of operation (as opposed to a low-torque control mode, described hereinafter) both of the stator windings 38 and 39 are driven concurrently.

Referring to FIG. 5, showing stator winding drive tables that are applicable to this embodiment, a table that is used during normal drive operation of the SR motor 13 will first be described, which is indicated as "Normal Drive (2-system conduction)". The twelve columns of the table correspond to respective time periods, referred to in the following description and in the appended claims as phase periods, in which the battery voltage may be applied from the motor driver circuit 34 and/or motor driver circuit 35 to one phase winding of each of the stator windings 38, 39, or to a phase winding of only one of the stator windings 38, 39, or concurrently to two phase windings of one of the stator windings 38, 39, or concurrently to two phase windings that respectively belong to the stator windings 38, 39. Each pattern of 12 phase periods is cyclically repeated.

With the drive tables shown in FIG. 5, in the case of operation in the normal-drive mode, the pattern is of the following form. In the first phase period of the cycle, both the Ua and Ub phase windings are driven concurrently, from the motor driver circuits 34 and 35; respectively, while in the second phase period the Ua and Va phase windings are driven concurrently from the motor driver circuit 34 and at the same time, the Ub and Vb phase windings are driven concurrently from the motor driver circuit 35. In the third phase period, the Va and Vb phase windings are driven concurrently. Such a drive method, applying concurrent driving of two phase windings of a stator winding during each transition from driving one of these phase windings to driving the other, is sometimes referred to as the "1-2 drive" method. This serves to prevent a lowering of the motor torque at each transition between the end of driving one phase winding of a stator winding and the start of driving another.

However it should be noted that it would be equally possible to drive the phase windings of each stator winding successively, one at a time, i.e., in the sequence Ua, Va, Wa, Ua, etc., for the stator winding of the A system and Ub, Vb, Wb, Ub, etc., for stator winding of the B system, by a "1-1 drive" method.

The stator winding drive table that is applied during low-torque operation can be one of the three tables indicated as Example 1, Example 2, Example 3 respectively, in the section indicated "Low-Torque Drive (1-system drive)" of FIG. 5.

With each of these low-torque drive table examples, the 1-2 drive method is applied, so that phase windings of the stator windings 38, 39 respectively are driven concurrently in certain phase periods.

In the case of the low-torque drive table of Example 1, the Ua phase winding of the stator winding 38 is driven during phase period 1, the Ua and Va phase windings are driven concurrently during phase period 2, the Va phase winding is driven during phase period 3 and so on, during a drive interval extending between phase periods 1 and 5 in which only the stator winding 38 is driven. However in phase period 6 (i.e., at the time of changeover between driving the stator winding 38 and driving the stator winding 39), the phase winding Wa of the stator winding 38 and phase winding Ub of the stator winding 39 are driven concurrently, then in phase period 7 only the phase winding Ub is driven, and so on, and during a drive interval extending between the phase periods 7 and 11 only the stator winding 39 is driven. The phase windings Ua and Wb are then driven concurrently, before driving of only the stator winding 38 is resumed.

Thus when the low-torque drive table of Example 1 is utilized then during each 12-period cycle, the phase windings are driven in the sequence:

(Ua→UaVa→Va→VaWa→Wa→WaUb→Ub→UbVb→Vb→VbWb→Wb→WbUa).

Similarly, if the low-torque drive table of Example 2 is utilized, the phase windings are driven in the sequence:

(Ua→UaVb→Vb→WaVb→Wa→WaUb→Ub→VaUb→Va→VaWb→Wb→UaWb).

If the low-torque drive table of Example 3 is utilized, the phase windings are driven in the sequence:

(Ua→VaUb→Vb→VaWb→Wa→UaWb→Ub→UaVb→Va→WaVb→Wb→WaUb).

With each of these examples of low-torque drive tables, it is ensured that two phase windings are driven concurrently during each transition between driving respective phase windings of one of the stator windings 38, 39, by the corresponding drive circuit 34 or 35, and also when changeover occurs between driving the stator winding of one system to driving the stator winding of the other system. It is thereby ensured that intermittent lowering of the motor torque is prevented, so that smooth and stable rotation of the rotor 37 is achieved during low-torque operation of the SR motor 13.

Figure 6:
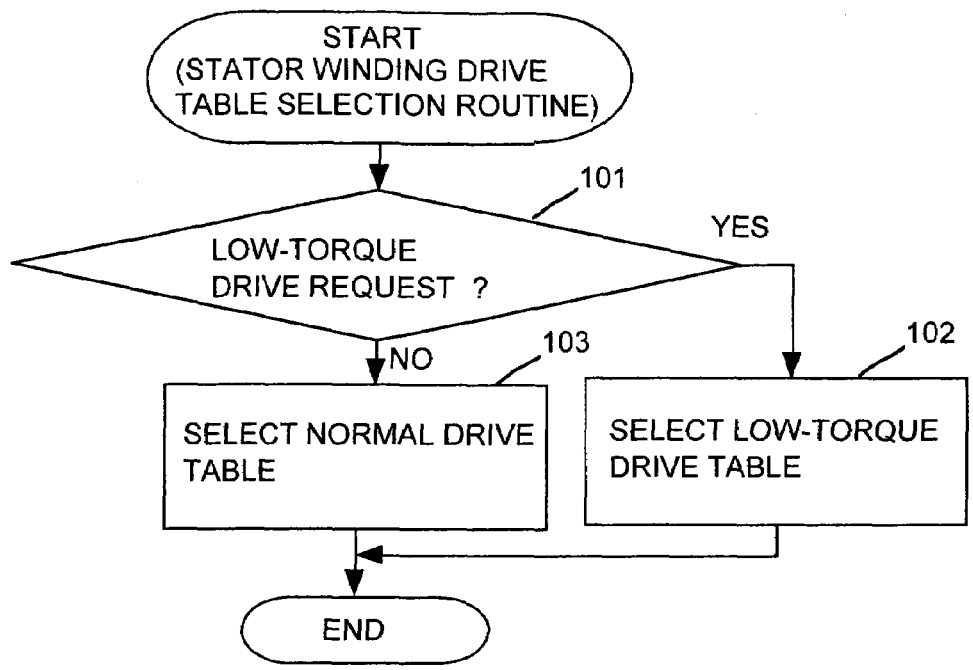
FIG. 6 is a flow diagram of a drive table selection routine that is performed by the first embodiment, to select a stator windings drive table.

Each time that a request for activation of the SR motor 13 is supplied to the ECU 33, it performs the stator winding drive table selection processing routine shown in FIG. 6, to select the appropriate drive table for either normal operation (i.e., 2-system operation) or low-torque operation (i.e., 1-system operation), to use in controlling driving of the SR motor 13. In the routine of FIG. 6, firstly in step 101 a decision is made as to whether or not a request for low-torque driving of the SR motor 13 has been received. If such a request has been received, then step 102 is executed, to select a low-torque drive table (e.g., one of the above-described three tables of FIG. 5, designated as Example 1, Example 2, Example 3 respectively), and the SR motor 13 is then driven accordingly. If it is judged in step 101 that the motor activation request is not a request for low-torque drive, then step 203 is executed, in which a normal-torque drive table such as that of FIG. 5 described above is selected, and the SR motor 13 is then driven accordingly.

It can thus be understood that with the first embodiment described above, during low-torque drive operation, the stator winding to which drive current is supplied is successively changed, in a cyclically recurring manner. For example if the low-torque drive table of Example 1 in FIG. 5 is applied, then during the first five phase periods of each cycle, electromagnetic forces acting on the rotor 37 are produced only by phase windings of the stator winding 38, during the sixth phase period these forces are produced by phase windings of the stator windings 38, 39 in combination, during the next five phase periods, the electromagnetic forces are produced only by the phase windings of the stator winding 39, and during the final phase period of the cycle, the forces are produced by phase windings of the stator windings 38, 39 in combination.

In that way, the electromagnetic forces applied to the rotor 37 from the stator of the SR motor 13 change direction in a cyclical manner, as the rotor 37 rotates. It is thereby ensured that forces acting along a limited range of directions will not be constantly applied between the shaft of the rotor 37 and the motor bearings. Unbalanced wear of the rotor shaft and the bearings can thereby be prevented, even if low-torque drive is continued for a substantially long duration.

Second Embodiment

A second embodiment will be described, which differs from the first embodiment described above only with respect to the way in which low-torque stator winding drive tables are selected. With the second embodiment, when the ECU 33 receives a request for activation of the SR motor 13, it performs the stator winding drive table selection processing routine shown in FIG. 7, to select the appropriate drive table for either normal operation (i.e., 2-system operation) or for low-torque operation (i.e., 1-system operation) in accordance with the mode of operation specified by the request. However the second embodiment differs from the first embodiment in that:

(a) each time low-torque drive is performed, only one of the systems A or B is utilized (i.e., either the stator winding 38 alone is driven, or the stator winding 39 alone is driven), and (b) the system which was not utilized in the preceding occasion of low-torque drive operation is selected.

Thus in this case, the stator winding drive tables can be as shown in FIG. 8, i.e., with the "normal drive" table being identical to that of the first embodiment, and two low-torque drive tables (each designated as "Low-Torque Drive (1-system drive)" in FIG. 8) respectively corresponding to system A and system B, i.e., utilized in driving the stator winding 38 and the stator winding 39 respectively.

Figure 7:
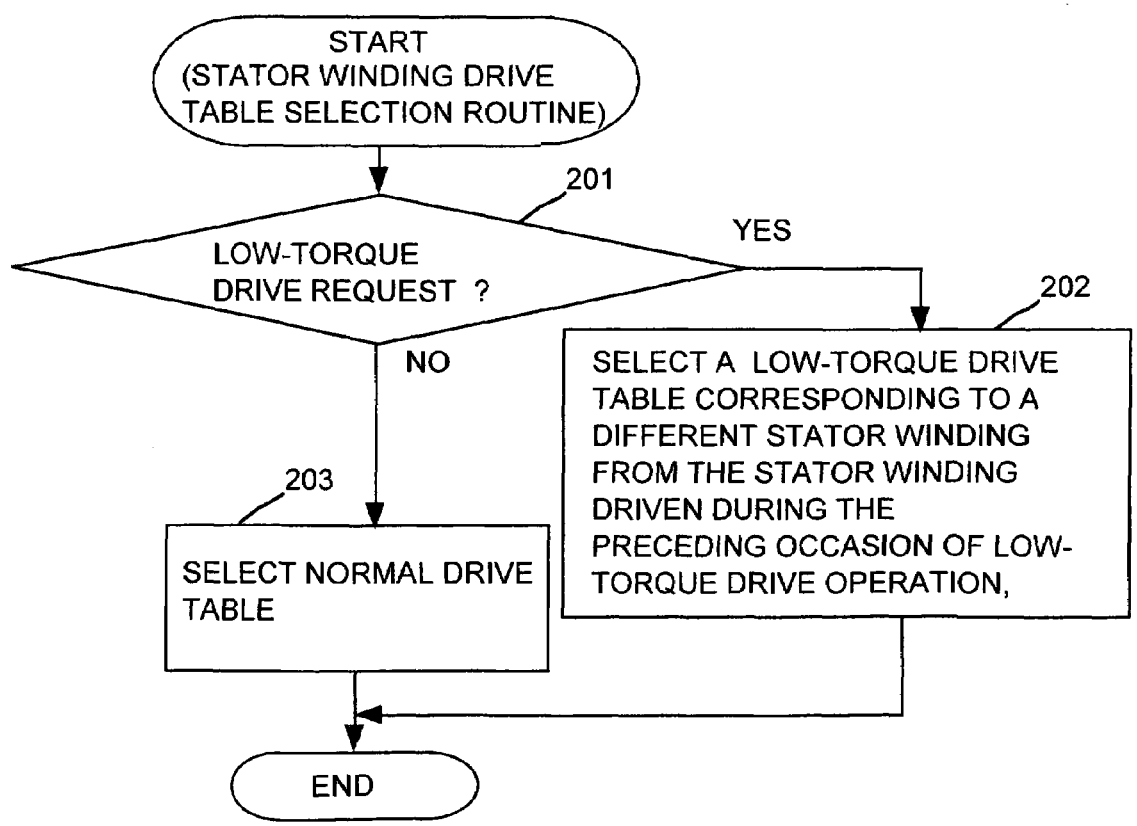
FIG. 7 is a flow diagram of a drive table selection routine that is performed by a second embodiment, to select a stator windings drive table.

In the routine of FIG. 7, firstly in step 201 a decision is made as to whether or not a request for low-torque driving of the SR motor 13 has been received. If such a request has been received, then step 202 is executed, in which a low-torque drive table is selected that corresponds to a system other than that which was utilized in the preceding occurrence of low-torque drive operation, and the SR motor 13 is then driven accordingly. If it is judged in step 201 that the motor activation request is not a request for low-torque drive, then step 203 is executed, in which the normal-torque drive table is selected, and the SR motor 13 is then driven accordingly.

The selection performed in step 202 can readily be implemented based on the state of a flag bit, which is set to the "1" state each time that the stator winding 38 of system A is utilized for low-torque operation, and is reset to "0" each time that the stator winding 39 of system B is utilized for low-torque operation. Thus for example if a request is received by the ECU 33 which specifies the SR motor 13 is to begin to be driven for low-torque operation, and the state of the flag bit indicates that system A was utilized at the preceding time of low-torque operation, then the low-torque drive table corresponding to system B would be selected in step 202.

In the same way as described for the first embodiment, it would be possible to use either the 1-2 drive method for each of the drive tables as shown in FIG. 8, or to use the 1-1 drive method, in which concurrent driving of two or more phase windings during transition phase periods, as described above, is not performed.

Thus with the second embodiment, each time that low-torque drive operation is newly performed, a (single) stator winding is driven, that is different from the stator winding that was driven during the preceding occasion of low-torque drive operation. Hence with the second embodiment also, it is ensured that forces acting along a limited range of directions will not be constantly applied between the shaft of the rotor 37 and the motor bearings. Unbalanced wear of the rotor shaft and the bearings can thereby be prevented, even if long-duration periods of low-torque drive should occur.

The invention has been described above with respect to embodiments applicable to a motor having two separate stator windings. However it would be equally possible to utilize a motor having three or more such stator windings, controlled as respectively separate systems. In that case, for example it would be possible to implement low-torque operation of the motor by driving a sub-set of the stator windings, e.g., by driving only two of the stator windings, or by driving only one of the stator windings. When three or more systems are utilized, during low-torque operation, changeover between driving respectively different sub-sets of the stator windings is performed in accordance with a predetermined pattern, as described for the above embodiments.

Furthermore with the above embodiments, a shift position switching mechanism of an automatic transmission performs switching between respective shift positions such as P, R, N and D positions. However the invention would be equally applicable to a shift position switching mechanism of an automatic transmission also having a low (L) position, or of an automatic transmission having only two shift positions, e.g., P and NotP.

It should be noted also that a motor control apparatus according to the present invention is not limited in application to an SR motor which actuates an automatic transmission shift position switching mechanism, and would be applicable to controlling SR motors or other types of synchronous motors used in various other applications.

What is claimed is:

1. A motor control apparatus for controlling a synchronous motor having a stator core with a plurality of respectively separate stator windings formed thereon, with each said stator winding comprising a plurality of phase windings and each said stator winding being capable of effecting rotation of a rotor of said motor when supplied with drive current, said motor control apparatus being selectively operable in a normal-torque drive mode and a low-torque drive mode;

wherein said motor control apparatus comprises means for selectively supplying drive current to successively alternating sub-sets of said plurality of stator windings in a predetermined pattern which periodically alternates between a condition in which said drive current is supplied to phase windings of each of said sub-sets and a condition in which said drive current is supplied to phase windings of only a part of said sub-sets, during operation in said low-torque mode.

2. A motor control apparatus according to claim 1, wherein said sub-sets comprise respective single stator windings.

3. A motor control apparatus according to claim 2 wherein during each occasion of operation in said low-torque mode, said motor control apparatus supplies drive current to successively alternating ones of said plurality of stator windings in a predetermined cyclically repeated pattern.

4. A motor control apparatus according to claim 3 wherein during an interval of changeover between supplying drive current to respective ones of a pair of said stator windings, said motor control apparatus supplies drive current concurrently to said pair of stator windings.

5. A motor control apparatus according to claim 3, said motor control apparatus supplying drive current to alternating ones of said plurality of stator windings in respective drive intervals during operation in said low-torque mode, each said drive interval comprising a plurality of phase periods;
wherein, in a phase period occurring at a changeover between supplying drive current to respective ones of a pair of phase windings of a stator winding, said motor control apparatus supplies drive current concurrently to said pair of phase windings.

6. A motor control apparatus according to claim 3, wherein during operation in said low-torque mode, said motor control apparatus supplies drive current to sequentially alternating ones of said stator windings in successive phase periods.

7. A motor control apparatus according to claim 6 wherein during operation in said low-torque mode, in a phase period occurring at a changeover between supplying drive current to respective ones of a pair of said stator windings, said motor control apparatus supplies drive current concurrently to respective phase windings of said pair of stator windings.

8. A motor control apparatus according to claim 1, wherein during each occasion when said low-torque mode is newly established, said motor control apparatus supplies drive current to only a specific sub-set of said plurality of stator windings, said specific sub-set being different from a sub-set of said stator windings that was supplied with drive current during an immediately preceding occasion when said low-torque mode was established.

9. A motor control apparatus according to claim 8, wherein said sub-sets comprise respective single stator windings.

10. A method of controlling a synchronous motor with a motor control apparatus, the synchronous motor having a stator core with a plurality of respectively separate stator windings formed thereon, with each said stator winding comprising a plurality of phase windings and each said stator winding being capable of effecting rotation of a rotor of said motor when supplied with drive current, said motor control apparatus being selectively operable in a normal-torque drive mode and a low-torque drive mode;
wherein said control method comprises selectively supplying drive current to successively alternating sub-sets of said plurality of stator windings in a predetermined pattern which periodically alternates between a condition in which said drive current is supplied to phase windings of each of said sub-sets and a condition in which said drive current is supplied to phase windings of only a part of said sub-sets, during operation in said low-torque mode.

11. A method according to claim 10, wherein said sub-sets comprise respective single stator windings.

12. A method according to according to claim 11, wherein during each occasion of operation in said low-torque mode, said drive current is supplied to successively alternating ones of said plurality of stator windings in a predetermined cyclically repeated pattern.

13. A method according to claim 12, wherein during an interval of changeover between supplying drive current to respective ones of a pair of said stator windings, said drive current is supplied concurrently to said pair of stator windings.

14. A method according to claim 12, wherein said drive current is supplied to alternating ones of said plurality of stator windings in respective drive intervals during operation in said low-torque mode, each said drive interval comprising a plurality of phase periods;
wherein, in a phase period occurring at a changeover between supplying drive current to respective ones of a pair of phase windings of a stator winding, said drive current is supplied concurrently to said pair of phase windings.

15. A method according to claim 12, wherein during operation in said low-torque mode, said drive current is supplied to sequentially alternating ones of said stator windings in successive phase periods.

16. A method according to claim 15, wherein during operation in said low-torque mode, in a phase period occurring at a changeover between supplying drive current to respective ones of a pair of said stator windings, said drive current is supplied concurrently to respective phase windings of said pair of stator windings.

17. A method according to claim 10, wherein during each occasion when said low-torque mode is newly established, said drive current is supplied to only a specific sub-set of said plurality of stator windings, said specific sub-set being different from a sub-set of said stator windings that was supplied with drive current during an immediately preceding occasion when said low-torque mode was established.

18. A method according to claim 17, wherein said sub-sets comprise respective single stator windings.

* * * * *